(12) United States Patent
Callender

(10) Patent No.: US 9,445,315 B2
(45) Date of Patent: Sep. 13, 2016

(54) METHOD AND APPARATUS FOR CELL RESELECTIONS

(75) Inventor: Christopher Peter Callender, Hampshire (GB)

(73) Assignee: Nokia Technologies Oy, Espoo (FI)

( * ) Notice: Subject to any disclaimer, the term of this patent is extended or adjusted under 35 U.S.C. 154(b) by 1261 days.

(21) Appl. No.: 12/752,752

(22) Filed: Apr. 1, 2010

(65) Prior Publication Data

US 2011/0244858 A1 Oct. 6, 2011

(51) Int. Cl.
*H04W 36/00* (2009.01)
*H04W 48/20* (2009.01)

(52) U.S. Cl.
CPC ......... *H04W 36/0055* (2013.01); *H04W 48/20* (2013.01)

(58) Field of Classification Search
CPC .......................... H04W 36/0055; H04W 48/20
See application file for complete search history.

(56) References Cited

U.S. PATENT DOCUMENTS

| 2009/0191862 | A1* | 7/2009 | Amirijoo et al. ............. 455/424 |
| 2009/0239533 | A1* | 9/2009 | Somasundaram et al. ... 455/434 |
| 2010/0210268 | A1* | 8/2010 | Lim et al. ..................... 455/436 |
| 2010/0260142 | A1* | 10/2010 | Jung ................. H04W 36/0077 370/331 |
| 2010/0278037 | A1 | 11/2010 | Jen |
| 2011/0026486 | A1* | 2/2011 | Hapsari .................. H04W 8/20 370/331 |
| 2011/0183676 | A1* | 7/2011 | Lee ................... H04W 36/0072 455/438 |

* cited by examiner

*Primary Examiner* — Ajit Patel
(74) *Attorney, Agent, or Firm* — Alston & Bird LLP

(57) ABSTRACT

In accordance with an example embodiment of the present invention, a user equipment initiates autonomous cell reselection from a source cell to a target cell. Subsequent to the reselection, the user equipment transmits information relating to the source cell to the target cell. The network is in some embodiments configured to use the information for self-organizing network purposes by connecting source-target cell pairs as neighbors.

13 Claims, 4 Drawing Sheets

METHOD AND APPARATUS FOR CELL RESELECTIONS

TECHNICAL FIELD

The present application relates generally to cellular communications and mobility in cellular communications.

BACKGROUND

Cellular systems typically comprise a plurality of cells and allow mobiles such as mobile telephones or user equipment, UE, to roam between the cells. Communications in a cell may take place between mobile units and a base station, BS, of the cell. When designing cellular networks, cells may be provisioned with lists of neighbouring cells. Such lists are called neighbour lists and may contain, for example, a list of scrambling codes of adjacent cells. Scrambling codes are used in code division multiple access, CDMA, based cellular networks. In systems or cells using time division multiple access, TDMA, technology, neighbour lists may comprise information on frequencies in use in neighbouring cells.

An UE camping in a cell may be configured to receive the neighbour list and subsequently search for signals using the scrambling codes contained therein. When certain trigger criteria are met, the UE and network may be configured to co-operatively transfer the UE to one of the neighbouring cells. Trigger criteria may include the UE measuring a certain amount of energy on one of the scrambling codes in the neighbour list while experiencing a weak signal from the cell it is camped in, which may correspond to the UE being located near a cell edge geographically. The transferring of the UE may be known as a handover procedure, a cell selection procedure or a cell reselection procedure, for example. A UE is transferred from a source cell to a target cell, wherein the UE is attached to the source cell before the handover or reselection procedure and the UE is attached to the target cell after the handover or reselection procedure.

Sometimes it may be straightforward to define neighbour lists for certain cells, but it may occur that the process is less straightforward depending on e.g. radio propagation characteristics. Compiling the neighbour list for each cell in a cellular network may entail a significant effort in the network planning stage. Networks that are designed to at least in part automate the compilation of neighbour lists may be known as self-organizing networks, SON.

SUMMARY

Various aspects of examples of the invention are set out in the claims.

According to a first aspect of the present invention there is provided an apparatus comprising a memory configured to store information relating to at least one of an identity of a source cell and a physical characteristic of the source cell, control circuitry configured to initiate a cell selection or cell reselection procedure from the source cell to a target cell responsive to analyzing measurement data, and transceiver circuitry configured to initiate transmitting the stored information to the target cell.

According to a second aspect of the present invention, there is provided a method comprising storing information relating to at least one of an identity of a source cell and a physical characteristic of the source cell, initiating in a user equipment a cell selection or cell reselection procedure from a source cell to a target cell responsive to analyzing measurement data, and initiating transmitting the stored information to the target cell;

According to a third aspect of the present invention, there is provided an apparatus comprising at least one processor and at least one memory including computer program code, the at least one memory and the computer program code configured to, with the at least one processor, cause the apparatus to perform at least the following: receive a notification message from a user equipment comprising an indication that the user equipment has changed attachment from a source cell to a target cell and information relating to at least one of an identity of the source cell and a physical characteristic of the source cell, determine at least one of whether the source cell is comprised in a neighbor list of the target cell and whether the target cell is comprised in a neighbor list of the source cell, and responsive to a determination that the source cell is not comprised in a neighbor list of the target cell, initiate updating the neighbor list of the target cell to include the source cell].

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
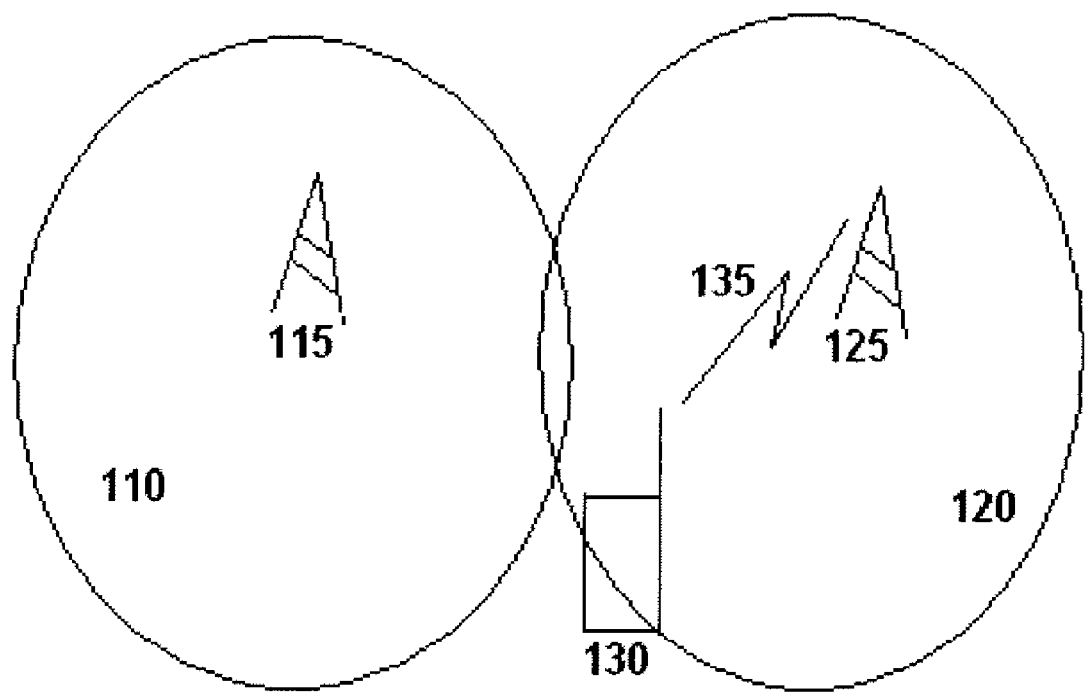
FIG. 1 illustrates a section of a cellular network capable of supporting embodiments of the present invention.

FIG. 1 illustrates a section of a cellular network capable of supporting embodiments of the present invention. FIG. 1 illustrates cell 110 and its base station 115. FIG. 1 also illustrates cell 120 and its base station 125, as well as UE 130. Cells 110 and 120 are portrayed as partially overlapping near the geographical location of UE 130. In the situation illustrated, UE 130 is attached to cell 120 and is communicating with BS 125 via a wireless interface 135. Wireless interface 135 may be an interface based on CDMA technology, time division multiple access, TDMA, technology, orthogonal frequency division multiple access, OFDMA, technology or combinations of these technologies, for example. In some embodiments of the invention, cell 110 may be based on a different technology or combination of technologies than cell 120. UE 130 may be in an active or idle state. When in an active state, UE 130 may transmit information to BS 125 via wireless link 135 and receive information from NC 125 via wireless link 135. The transmitted information may comprise coded speech or digital files, for example. Wireless link 135 may thus be a two-way link comprising an uplink and a downlink. The uplink and downlink may be separated from each other in frequency or time domain, for example. When in an idle state UE 130 may be configured to not maintain an active uplink but limit itself to monitoring a downlink channel for paging messages from BS 125. Responsive to receiving a paging message from BS 125 or otherwise, UE 130 may be configured to change its status to an active status.

UE 130 is close enough to the cell edge of cell 120 to be able to measure energy transmitted by BS 115 using a scrambling code of cell 110, for example. If UE 130 measures energy from cell 110 and determines that there is a weak link between UE 130 and BS 125, a handover or reselection process may be triggered whereby UE 130 would change its attachment from BS 125 to BS 115. A handover decision may be taken in the cellular network based on a measurement report transmitted by UE 130 to BS 125, for example. A radio access network controller or other network node may be configured to make the decision to move US 130 from cell 120 to cell 110. A radio access network controller or other network node is not illustrated in FIG. 1, but base stations 115 and 120 may be connected directly or indirectly to such nodes. In idle mode, the UE 130 may decide on initiating the reselection procedure itself, or the decision may be made by the base station 125. In some embodiments of the invention, the UE 130 may be competent to decide autonomously on reselections when in a connected state.

If UE 130 has been provided with a scrambling code of cell 110 in, for example, a neighbor list UE 130 may use the scrambling code to search for a transmission from cell 110. If UE 130 is not furnished with a neighbor list, or is furnished with a neighbor list not comprising a scrambling code of cell 110, UE 130 may find a transmission from BS 115 in cell 110 without prior knowledge of a scrambling code of cell 110. UE 130 may be sent an indication from BS 125, for example, that it may measure energy on scrambling codes or frequencies that are not included in neighbour lists. The UE 130 may be provisioned with this indication when it enters into the cellular network, or the UE 130 may be provisioned with this indication when a subscription is activated, or the UE 130 may be provisioned with this indication when it camps on BS 125. The indication that a UE may measure energy on scrambling codes or frequencies that are not included in neighbour lists may be transmitted to all UEs in the network, or to all UEs that are capable of measuring energy on scrambling codes or frequencies that are not included in neighbour lists. The indication may be deactivated at a later point in time by sending a second indication to concerned UEs, or the indication may comprise an indication of a time after which it is no longer valid.

In some embodiments, responsive to determining that it has found energy on a scrambling code or frequency which is not on a neighbour list, UE 130 is configured to transmit a measurement report concerning the finding to the network via BS 125. In other embodiments, UE 130 is competent to autonomously act on the finding and initiate a cell reselection procedure to cell 110. The UE 130 may use its radio receiver to perform a radio part of the measurement, and a processor or control circuitry comprised in the UE may determine a result of the measurement by analyzing data obtained from the radio receiver by internal signaling within UE 130. UE 130 may be competent to act autonomously for example if it is in a cell-PCH, cell-paging channel, state, which is a connected state used for power saving purposes in a network. Another example of a connected state is a cell forward access channel, cell-FACH, state. Another example of a connected state is UTRAN registration area paging channel, URA-PCH, state. The UE may be configured to store information relating to the source cell in an internal memory. Subsequent to reselecting to a new cell, UE 130 may be configured to transmit a notification message to the network updating its cell attachment information. The network is thereby notified that UE 130 is reachable in the target cell. The network may be configured to use the cell attachment information to locate the UE on a cell level and page it in case the network receives incoming information or a call addressed to the UE. The notification message may be a radio resource control, RRC, connection setup message, a cell update complete or a UTRAN registration area update complete message, for example.

Responsive to autonomously reselecting to a cell the scrambling code or frequency of which was not on a neighbor list, UE 130 may be configured to include in the notification message information concerning the source cell. The information may comprise information relating to an identity of the source cell, for example a global cell identity, CGI and/or base station identity code, BSIC. The information may additionally or alternatively comprise a physical characteristic of the source cell, for example a scrambling code used by the source cell or a frequency used by the source cell. A frequency may be indicated as a frequency band index or as an absolute radio frequency channel number, ARFCN, for example. CGI and scrambling codes are used in wideband CDMA, WCDMA, cells, whereas BSIC and ARFCN are used in global system for mobile communications, GSM, cells. The information may additionally include measurements of the source cell such as measured energy of the source cell prior to reselection.

A network node may be configured to act on notification messages from UEs comprising information on source cells. In detail, the network node may keep track of cells where a UE roams to determine pairs of reselection source-target cells. As it is likely that a UE reselects between adjacent or neighbouring cells, the source and target cells may be set as each other's neighbours in neighbour lists of the respective source and target cells. By collecting information from UEs roaming in the network, the network node may thus cause the network to perform as a self-organizing, SON, network by compiling neighbour lists for cells without separate intervention from human operators. In addition to adding new neighbour cells, the network node may be configured to remove a cell from a neighbour list, if it is determined that reselections from that cell are no longer occurring, or occur only infrequently. The network node may be a radio network controller, RNC. The network node may alternatively be a base station controller, BSC, or a mobility management entity, MME, of a long term evolution, LTE, system, or a dedicated SON management node.

The described method may be suitable for compiling neighbour lists for and/or from intra-frequency, inter-frequency, and inter-radio access technology, inter-RAT, reselections. In intra-frequency reselections the source and target cells operate at the same carrier frequency. In inter-frequency reselections the source and target cells operate at different carrier frequencies. In inter-RAT reselections the source and target cells operate using different radio access technologies, such as WCDMA, GSM and LTE, for example. Neighbour lists can be generated in this way from normal operation of the network and UEs, without needing dedicated measurements in active mode for the purpose. Active mode measurements may cause gaps in active mode transmissions, which may degrade a perceived quality of service for a user of UE 130. For example, if UE 130 is in active communication with BS 125 and performs a measurement to determine whether transmissions from BS 115 exist in a carrier frequency different to the carrier frequency of cell 120, the active communication with BS 125 may have to be interrupted while UE 130 performs a measurement on the carrier frequency of cell 110. Neighbour lists generated in this way can also be used for the normal operation of legacy UEs, which do not have the capability to reselect to cells which are not included in the neighbour list.

Figure 2:
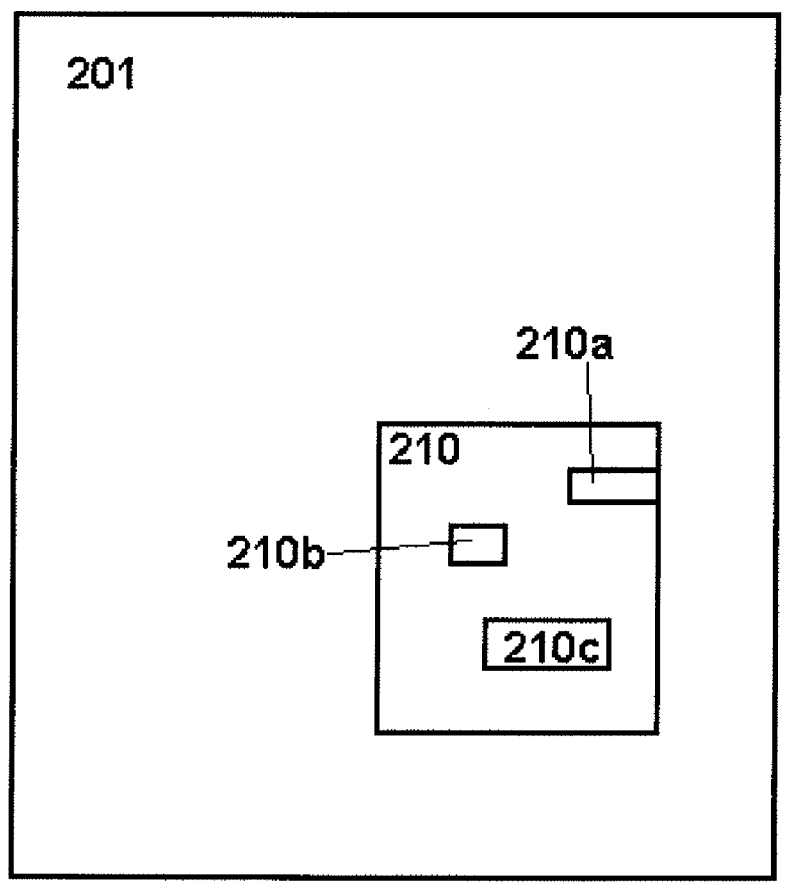
FIG. 2 illustrates an example apparatus 201 capable of supporting embodiments of the present invention.

FIG. 2 illustrates an example apparatus 201 capable of supporting embodiments of the present invention. The apparatus may correspond to UE 130 of FIG. 1, for example. The apparatus is a physically tangible object, for example a mobile telephone, personal digital assistant, data dongle or a similar device. The apparatus may comprise a control apparatus 210, for example a digital signal processor (DSP), processor, field-programmable gate array (FPGA), application-specific integrated circuit (ASIC), chipset or controller. The apparatus may further comprise transceiver circuitry 210a configured to enable the apparatus 201 to connect to a network. The apparatus may comprise memory 210b configured to store information, for example information relating to the identity or physical characteristics of a source cell. The memory may be solid-state memory, dynamic random access memory (DRAM), magnetic, holographic or other kind of memory. The apparatus may comprise logic circuitry 210c configured to access the memory 210b and control the transceiver circuitry 210a. The logic circuitry 210c may be implemented as software, hardware or a combination of software and hardware. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transceiver circuitry 210a. The logic circuitry 210c may be control circuitry. The transceiver circuitry 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transceiver circuitry 210a, memory 210b and logic circuitry 210c may be comprised in the apparatus as hardware elements such as integrated circuits or other electronic components. The same applies if the apparatus 201 does comprise a control apparatus 210 but some, or all, of the transceiver circuitry 210a, memory 210b and logic circuitry 210c are not comprised in the control apparatus 210.

Figure 3:
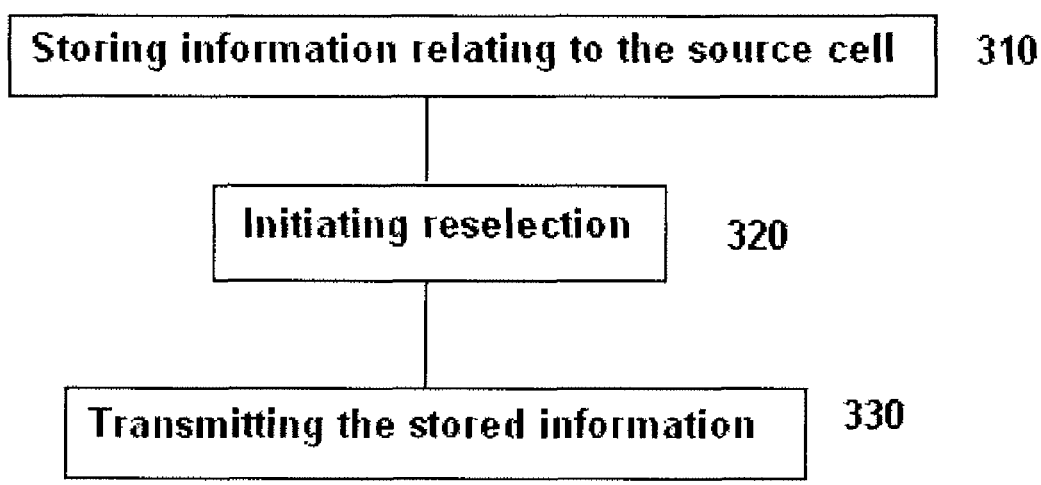
FIG. 3 is a flow diagram showing operations for operating a user equipment according to an embodiment of the invention.
Figure 4:
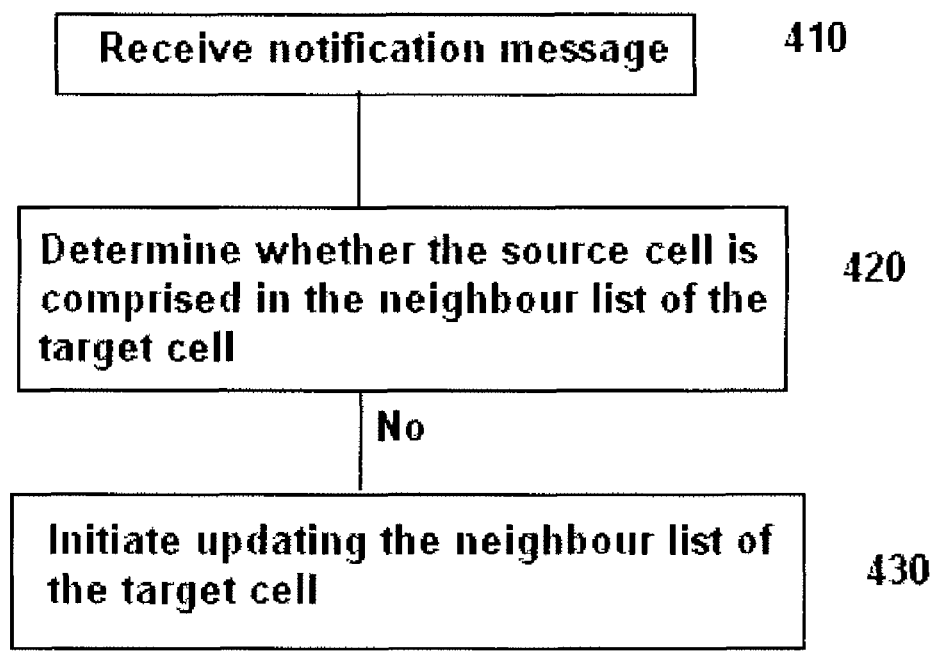
FIG. 4 a flow diagram showing operations for operating a network node according to an embodiment of the invention.

FIG. 3 is a flow diagram showing operations for operating a user equipment, UE, according to an embodiment of the invention.

In phase 310 information relating to the source cell is caused to be stored in an internal memory of a UE. The information may comprise information relating to an identity of the source cell, for example a global cell identity, CGI and/or base station identity code, BSIC. The information may additionally or alternatively comprise a physical characteristic of the source cell, for example a scrambling code used by the source cell or frequency information of the source cell such as an absolute radio frequency channel number, ARFCN. Also other kind of identity and/or physical characteristic information relating to the source cell may be stored. Phase 320 may be performed before phase 310, or phase 320 may be performed after phase 310.

In phase 320, a user equipment such as, for example, UE 130 of FIG. 1 initiates reselection from a source cell to a target cell. The initiating may take place autonomously if the UE is in either idle or a connected mode. The initiating may take place responsive to a determination that radio communication with the target cell has become possible while radio communication with the source cell has become difficult. The initiating may also occur responsive to other triggers, for example a determination concerning a geographical location of the UE and coverage information of the source cell stored in the UE.

In phase 330 the stored information is caused to be transmitted to the target cell in a notification message. Phase 330 may be triggered by completion of the reselection procedure from the source cell to the target cell. The notification message may be a radio resource control, RRC, connection setup complete message, a cell update or a UTRAN Registration Area update message, for example. The notification in phase 330 may also be triggered at the request of the target cell. The request to perform phase 330 may be included for example, in a radio resource control, RRC, connection setup message, a cell update confirm message or a UTRAN Registration Area confirm message FIG. 4 a flow diagram showing operations for operating a network node according to an embodiment of the invention. In phase 410, a notification message as described in connection with FIG. 3 is received. The message may be received in a network node such as a BS, RNC, BSC or MME, for example. The notification message comprises information relating to the source cell as described in connection with FIG. 3.

In phase 420 the network node determines whether the source cell is comprised in a neighbour list of the target cell. Responsive to the source cell not being comprised in the neighbour list of the target cell, the network node may cause the neighbour list to be updated to include the source cell by causing information identifying and/or physically characterizing the source cell to be added to the neighbour list of the target cell, phase 430. In some embodiments, the network node requires more than one reselection from the source cell to occur before it causes the neighbour list of the target cell be updated to include the source cell. In some embodiments, the network node requires a certain number of reselections within a set period of time to occur before it causes the neighbour list of the target cell be updated to include the source cell. In some embodiments, the network node may be configured to update the neighbour list of the target cell to exclude a cell comprised in the neighbour list of the target cell responsive to a determination that reselections from that cell are no longer occurring, or occur only infrequently.

In some embodiments, the network node is also configured to determine whether the target cell is comprised in a neighbour list of the source cell. In these embodiments, the network node is configured to update the neighbour list of the source cell to comprise the target cell responsive to receiving the notification message and making the determination, with considerations similar to those described above in connection with updating the neighbour list of the target cell. In embodiments where the network node is the BS of the target cell, the network node may only be configured to update the neighbour list of the target cell, for example. In embodiments where the network node is a RNC or MME, for example, the network node may be configured to update the neighbour lists of both target cell and source cell in a symmetrical fashion.

As can be seen, the UE and the network node work in an interrelated manner to enable at least some benefits of the present invention to be obtained.

Without in any way limiting the scope, interpretation, or application of the claims appearing below, a technical effect of one or more of the example embodiments disclosed herein is that in inter-frequency handover little disruption is incurred to normal processing. This is due to the fact that determining system information in a target cell may take a relatively long period of time, for example 320 ms. Connecting source and target cells in connection with reselections provides the connections with little disruption since the system information is determined in connection with the reselection. According to an alternative solution an UE might determine system information of a candidate target cell without performing reselection, which would entail a disruption in reception of the source cell during the inter-frequency measurement. Another effect of the invention according to some embodiments is that legacy devices not supporting the invention can benefit from neighbour lists updated according to the principles of the invention using notification messages from UEs that do support the invention.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

The scope of the invention also comprises computer programs configured to cause methods described herein to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   memory configured to store information relating to at least one of an identity of a source cell and a physical characteristic of the source cell;
   control circuitry configured to initiate a cell selection or cell reselection procedure from the source cell to a target cell responsive to analyzing measurement data; and
   transceiver circuitry configured to initiate, in response to completion of the procedure initiated by the control circuitry, transmitting the stored information to the target cell,
   wherein the apparatus is embodied in a user equipment and remote from base stations of the source and target cells.

2. An apparatus according to claim 1, wherein the control circuitry is further configured to obtain the measurement data from a radio receiver comprised in the apparatus.

3. An apparatus according to claim 1, wherein the apparatus is configured in a connected state.

4. An apparatus according to claim 3, wherein the apparatus is configured in a cell physical channel, cell-PCH state.

5. An apparatus according to claim 1, wherein the control circuitry is further configured to initiate a cell selection or cell reselection procedure from a source cell to a target cell, wherein the source and target cells conform to different radio access technologies.

6. An apparatus according to claim 1, wherein the control circuitry is further configured to initiate a cell selection or cell reselection procedure from a source cell to a target cell, wherein the source and target cells operate at a different carrier frequency.

7. A method, comprising:
   causing storing of information, at a user equipment, relating to at least one of an identity of a source cell and a physical characteristic of the source cell;
   initiating in the user equipment a cell selection or cell reselection procedure from a source cell to a target cell responsive to analyzing measurement data; and
   in response to completion of the cell selection or cell reselection procedure, initiating transmitting the stored information to the target cell.

8. A method according to claim 7, further comprising obtaining the measurement data from a radio receiver comprised in the user equipment.

9. A method according to claim 7, wherein the user equipment is configured in a connected state.

10. A method according to claim 9, wherein the user equipment is configured in a cell physical channel, cell-PCH state.

11. An apparatus, comprising:
    at least one processor; and
    at least one memory including computer program code
    the at least one memory and the computer program code configured to, with the at least one processor, cause the apparatus to perform at least the following:
    cause storing of information relating to at least one of an identity of a source cell and a physical characteristic of the source cell;
    initiate by the apparatus in a user equipment a cell selection or cell reselection procedure from the source cell to a target cell responsive to analyzing measurement data; and
    in response to completion of the cell selection or cell reselection procedure, initiate transmitting the stored information to the target cell.

12. An apparatus according to claim 11, wherein the at least one memory and the computer program code are configured to, with the at least one processor, further cause the apparatus to receive an indication that the apparatus may obtain measurement data on scrambling codes or frequencies that are not included in neighbour lists.

13. A computer program product comprising a non-transitory computer-readable storage medium bearing computer program code embodied therein for use with a computer, the computer program code comprising:
    code for causing storing, at a user equipment, of information relating to at least one of an identity of a source cell and a physical characteristic of the source cell;

code for initiating a cell selection or cell reselection procedure from a source cell to a target cell responsive to analyzing measurement data; and code for initiating, in response to completion of the cell selection or cell reselection procedure, transmitting the stored information to the target cell.

\* \* \* \* \*